March 17, 1942.　　L. F. POOCK ET AL　　2,276,626
MEASURING INSTRUMENT
Filed Oct. 21, 1939　　2 Sheets-Sheet 1

Inventor
Louis F. Poock
Willis Fay Aller
Maréchal & Noé
Attorney

March 17, 1942.　　L. F. POOCK ET AL　　2,276,626
MEASURING INSTRUMENT
Filed Oct. 21, 1939　　2 Sheets-Sheet 2
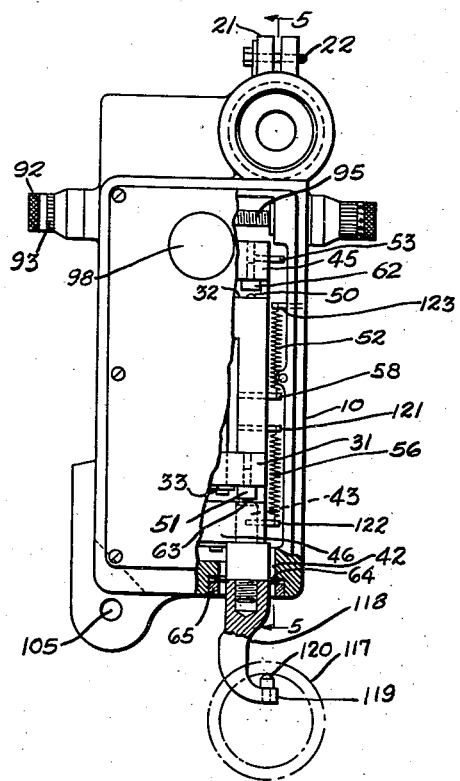
Fig. 4
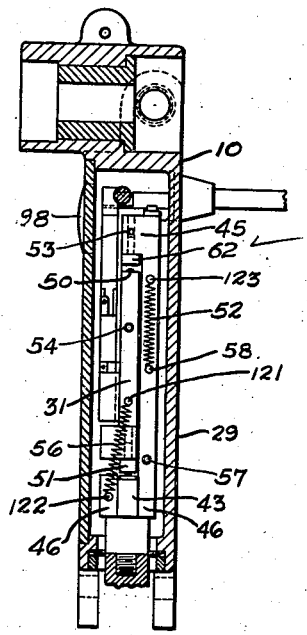
Fig. 5
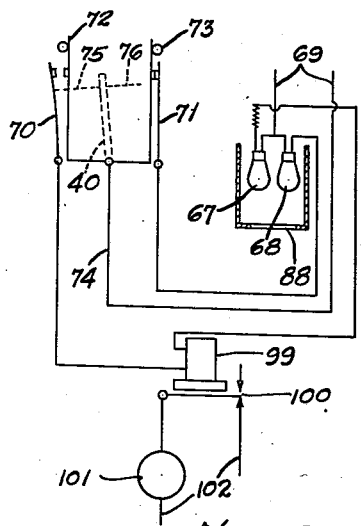
Fig. 8
Fig. 6
Fig. 7
Inventor
Louis F. Poock
Willis Fay Aller
Maréchal & Noë
Attorney Patented Mar. 17, 1942

2,276,626

UNITED STATES PATENT OFFICE 2,276,626

MEASURING INSTRUMENT

Louis F. Poock and Willis Fay Aller, Dayton, Ohio, assignors to The Sheffield Corporation, a corporation of Ohio Application October 21, 1939, Serial No. 300,648

11 Claims. (Cl. 51—165)

This invention relates to gaging instruments, and more particularly to gaging instruments for accurately checking or gaging size relationships such as the size or diameter of a measured part with respect to a standard part or dimension.

One object of the invention is the provision of a gaging instrument having provision for lost motion between a work operated part and a gaging member, preventing movement of the gaging member beyond a predetermined position while permitting free movement of the work operated part.

Another object of the invention is the provision of a gaging instrument including a spring supported block which is operably connected to a gaging member and which is definitely limited in its movements by a fixed stop, the block being normally yieldingly engaged with a movable part, operated by the work, and capable of being moved away from the block when the work being gaged exceeds a predetermined size as determined by the fixed stop.

Another object of the invention is the provision of a gaging instrument adapted to be mounted on a machine tool for gaging work during a sizing operation, the gage having provision whereby the gaging element may remain stationary during the sizing operation until the work reaches a predetermined size, and is then automatically rendered operative to accurately gage the size of the work.

Another object of the invention is the provision of a gaging instrument of the character mentioned for use on a machine tool, the gage body being carried for yielding bodily movement by a hydraulic control which maintains a positioning arm on the gage body in yielding contact with the work.

Other objects and advantages of the invention will be apparent from the following description, the appended claims, and the accompanying drawings, in which a preferred embodiment of the invention has been illustrated.

In the drawings, in which the same reference characters have been applied to like parts in the several views::

Fig. 4 is a side elevation of the gage as converted for measuring internal diameters by an upward gaging pressure of the gaging point;

Fig. 5 is a section on the line 5—5 of Fig. 4;

Fig. 6 is a side elevation showing a gage and its mounting on a portion of a machine tool;

Fig. 7 is a front elevation of the gage and its mounting; and

Fig. 8 is a diagrammatic view showing the electrical circuits employed for the automatic control of the work feeding means of the machine tool.

Figures 1, 2, 3:
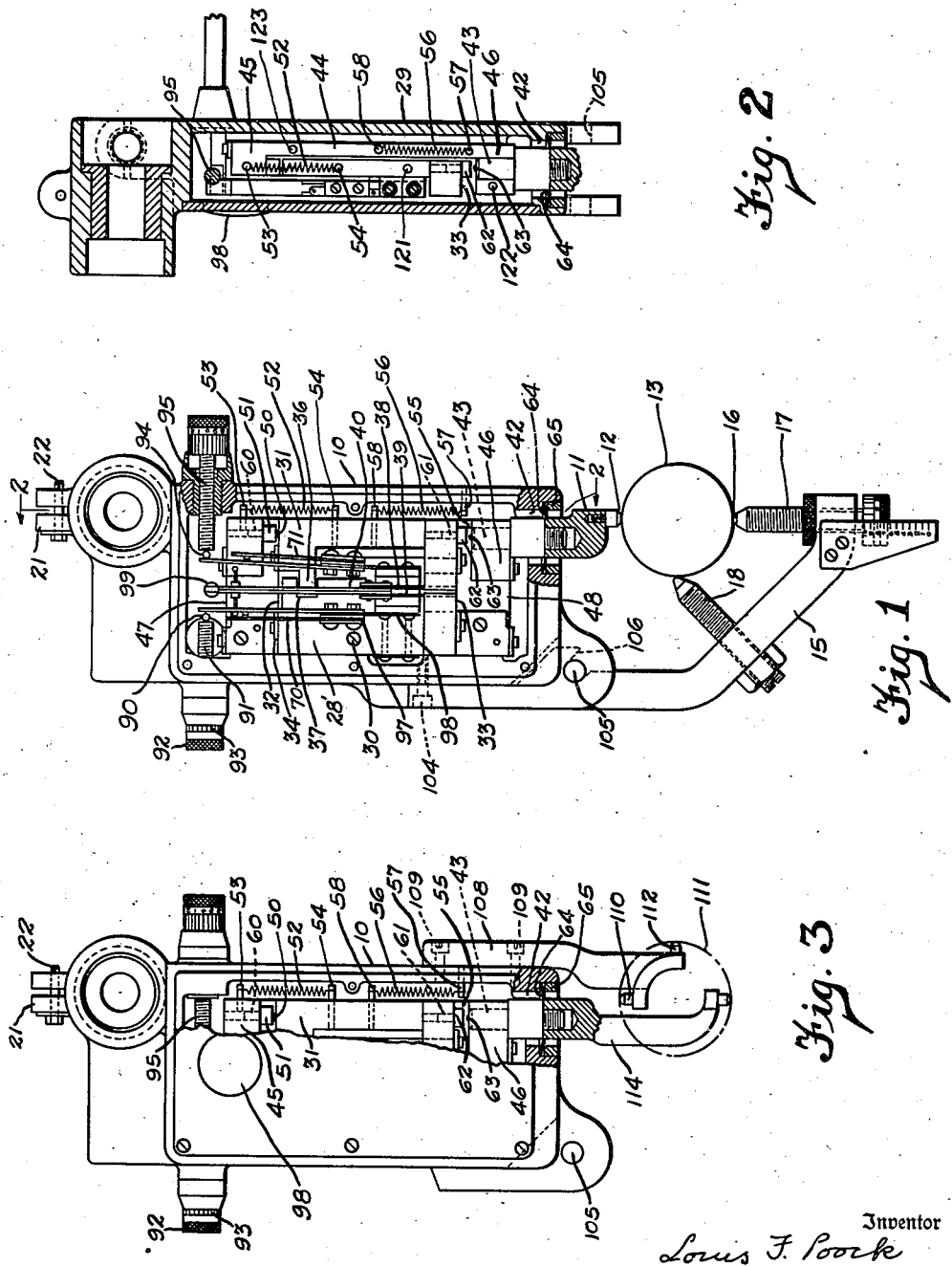
Fig. 1 is a side elevation of a gage embodying the present invention and shown with the housing cover plate removed and parts of the gage in section.
Fig. 2 is a section on the line 2—2 of Fig. 1.
Fig. 3 is a side elevation of the gage shown in Fig. 1 but equipped with a different positioning arm and gaging point, adapting the gage for measuring internal diameters.

Referring more particularly to the drawings, the gage shown in Figs. 1 and 2 comprises a suitable housing 10 which carries a work engaging element 11 having a gaging point 12 that is adapted to contact and be moved by the work 13 to be gaged or measured. The gaging member operated by the work engaging element is such as to control an indicating mechanism by which the operator determines whether the work piece is of the required size, as by comparing the indication produced with that obtained on a standard part placed below the gaging point.

Fixed to the housing 10 is a gage positioning arm 15 having a work engaging stop point 16 carried by a screw 17 which is adjustably mounted in the lower end of the arm for adjustment towards and from the gaging points 12 in accordance with the size or diameter of the part to be measured. A second screw 18 is adjustably positioned on the arm 15 for engaging one side of the work so that the gaging point 12 will be diametrically opposite the stop point 16.

In accordance with the preferred embodiment of the invention, the entire gage housing 10 is movably supported on a machine tool in which a sizing or grinding operation is carried out on the work piece during the gaging operation. Thus as shown in Figs. 6 and 7, the housing is mounted for movement about a horizontal axis on a shaft 19 which is carried by the upper end of an arm 20. The latter is preferably provided with a bifurcated clamp portion 21 which may be adjustably clamped to the shaft 19 by means of a clamp screw 22, thus providing for axial adjustment of the shaft 19. The lower end of the arm 20 is fixed to a horizontal shaft 23 which is rotatably mounted in a standard 24 carried by a portion of the frame 25 of the machine tool by which a sizing operation is performed on the work as by means of a grinding wheel 26. The arm 20 is yieldingly urged in a counterclockwise direction as viewed in Fig. 6 by means of a hydraulic pressure device incorporated in a chamber 28, and the normal position of the arm 20 when the gage is not in use is substantially upright, positioning the gage housing 10 in front of the work and above it. However the housing 10 may be pulled down by the operator against the action of the hydraulic pressure, and brought into engagement with the work, in the position shown in Fig. 6, and in this position the hydraulic pressure exerted on the arm 20 will maintain the positioning point 16 in yielding engagement with the lower side of the work so that the relative movement of the work engaging element 11 with respect to the point 16 will be effective on the gaging instrument. As the diameter of the work decreases during the grinding operation, the housing will be automatically positioned so as to maintain a desired predetermined pressure between the work and the fixed point 16.

Within the housing 10 is a fixed metal block 28', held in place on the rear housing wall 29 by means of suitable attaching screws 30. Adjacent the fixed block is a movable block 31, supported from the fixed block by means of a pair of parallel flexible spring blades 32 and 33. One end of each of these blades is secured rigidly by a small clamp 34 to the fixed block 28' and the other end of each is secured by a similar clamp to the movable block 31, thus mounting the latter for yielding movement in a substantially straight line perpendicular to the axis of the work.

The movable block 31 is provided with a tongue 36 which projects into a recess 37 in the fixed block, the height of the recess being somewhat in excess of the height of the tongue 36 to permit a desired range of travel of the movable block while definitely limiting its movements beyond a predetermined range.

Secured at their lower ends to closely adjacent portions of the fixed and movable blocks are two flexible spring strips 38 and 39, which are fastened securely at their upper portions to a movable rigid arm 40, which is thus carried for swinging movement about a theoretical center near the lower ends of the spring strips 38 and 39. In its normal position the arm 40 extends substantially vertically as shown in Fig. 1, when a work piece of the proper size is engaged by the element 11, and in this position the spring strips 32 and 33 are straight and parallel to one another. If the work is oversize, in a gage arranged as shown in Fig. 1 for checking an external diameter the upper end of the arm 40 will be displaced to the left of its normal position, and a displacement of the arm 40 to the right of its normal position will show that the work is undersize. The position of the arm 40 may be indicated by an electrical control device as will be presently described, and may also be effective in automatically controlling a feeding or operating drive of the machine tool so that when the work piece attains a desired size, the grinding or sizing operation will be automatically stopped.

The work engaging element 11 projects upwardly into an opening 42 in the housing and is detachably threaded or secured to a movable element or block 43 which has an upwardly extending side portion 44 and upper and lower projecting end portions 45 and 46 respectively as will be apparent from Fig. 2. The top of the upper end portion 45 and the bottom of the lower end portion 46 are connected to the upper and lower ends of the fixed block 28' by means of two parallel spring blades 47 and 48 which carry the element 43 for reciprocatory movement parallel to the direction of movement of block 31. The latter is arranged between the projecting ends 45 and 46. Fixed on the upper side of the movable block 31 is a rounded hard thrust point 50 which is normally held in yielding engagement with an abutment block 51, the latter being removably carried in the end portion 45. This yielding engagement is effected by a spring 52 connected at its upper end to a pin 53 which projects from the end portion 45, the lower end of the spring being connected to a pin 54 which projects from the movable block 31. The yielding pressure exerted by the spring 52 is sufficient so that the block 31 and the element 43 move together during a gaging operation throughout the limits of travel of the block 31, but when upward travel of the block 31 is stopped by engagement of the upper side of the tongue 36 with the movable block 31, then the work may produce a continued upward movement of the element 43, while the block 31 and the arm 40 remain stationary, as the abutment 51 will merely move away from the point 50, there being a sufficient clearance space 55 between the lower end of the movable block and the projection 46 of the movable element to permit this.

The spring 52 is not effective to yieldingly urge either the element 43 or the block 31 upwardly or downwardly with respect to the housing, but merely holds the upper end of the block 31 in contact with the abutment block 51 in the normal gaging movements of the block. The weight of these parts acts downwardly and serves to normally project the work engaging element into yielding contact with the work, and a spring 56 is also provided between a pin 57 on the housing and a pin 58 on the element 43 to yieldingly hold the latter in its extended or lowered position.

It should also be noted that the space between the hard thrust point 50 and the lower side of the projection 45 of the movable element is the same as the space between the lower side of the block 31 and a hard thrust point on the projection 46. The abutment block 51 is fixed to the end of a pin 60 which is detachably secured in the projecting portion 45 of the movable element, and the pin 60 is of the same size as a pin 61 which carries an abutment block 62 which is arranged on the lower side of the movable block and which is normally spaced some little distance above the thrust point 63 fixed in the projecting portion 46 of the movable element.

The opening 42 in the housing through which a portion of the work engaging element extends is substantially larger in diameter than the element 11, and a flexible sealing ring 64 is interposed between and fixed to the work engaging element and the housing, being clamped between the upper side of the removable element 11 and the lower side of the movable element 43, and having its peripheral portions clamped between a shoulder on the housing and a removable retaining member 65 which is threaded or seated in the housing. Any cooling fluid which might be used during the grinding operation is thus kept out of the interior of the housing, while the construction freely permits up and down movement of the work engaging element and permits the very slight lateral movement of the work engaging element that takes place, as it moves up and down, because of the way in which it is carried by springs 47 and 48.

The arm 40 may be used to control the energization of a pair of lamps of different color to give an indication as to the size of the part being gaged. Thus as shown in Fig. 8 a green lamp 67 and a red lamp 68 may be connected to some suitable source of current through a common supply lead 69 and respectively connected to the two spring contact strips 70 and 71 each of which is normally contacted by adjustable contact strips 72 and 73 respectively. Strips 72 and 73 are connected to a common lead wire 74 extending to the supply source. The movable arm 40 carries projecting fingers 75 and 76 of insulating material, projecting through openings in the strips 72 and 73 into engagement, at times, with the strips 70 and 71 respectively. When arm 40 is in its normal position between the two strips 72 and 73 the insulating fingers 75 and 76 do not project far enough to open the circuits through the contacts carried by the strips 70 and 72 and the strips 71 and 73, and both of the lamps are energized, and they may be viewed through an opalescent glass 88 and show an apparent amber color. When the diameter of the work exceeds a predetermined desired size and the movable block 31 is slightly raised above the position shown in Fig. 1, arm 40 is moved slightly to the left, and the projecting insulating finger 75 opens the circuit to the green lamp, giving a red indication apparent to the operator. This opening of the circuit occurs because the spring strip 70 is pushed back away from the strip 72, the latter being yieldingly held against an adjustable abutment ball 90 which is adjustable horizontally in the housing, being carried on the end of a screw 91 having a handle or knob 92 by which it may be turned so as to project to a greater or lesser extent into the housing. Calibration marks 93 on the handle 92 indicate the position of the abutment ball 90. A similar abutment ball 94 is fixed on the end of an adjusting screw 95, determining the position of the strip 73. The lower ends of the strips 70, 72, 74 and 73 are secured to insulating strips 97 carried by spring strips 98 which yieldingly urge the strips 72 and 73 away from one another and in normal contact with the strips 70 and 71 respectively.

The normal upright position of the arm 40 is obtained, when a size block of the desired dimension is placed between the points 12 and 16, by adjusting the screw 17 in the arm 15, this normal position of the arm 40 being apparent to the operator through an observation glass 98. A marking or circle 99 on the rear wall of the housing directly back of the upper end of the arm 40 permits the operator to accurately locate the arm 40 in upright position when setting the gage preliminary to a gaging operation. The operator may then adjust the positioning of the abutment balls 90 and 94 to allow a permissible tolerance if the gaging instrument is used merely as a gage to give a visible indication to the operator, or if the device is used for automatically stopping the feeding or driving of the tool which performs a sizing operation on the work being gaged he may position the ball 90 so that the contact between the strips 72 and 70 is completed just when the work is reduced to the desired predetermined size, and adjust the abutment ball 94 so that contact will be broken between the strips 71 and 73 if the work is undersize.

In using the gaging instrument on a machine tool, with the gaging point 12 in engagement with the work, at the start of the operation the work will be somewhat larger than its final size, and the element 12 will be raised by the work, thus swinging the arm 40 to the left and opening the circuit between the strips 70 and 72. During the rotation of the oversize work, the green light will be deenergized and a red color be apparent to the operator through glass 88. Before the sizing operation on the work starts, the work may be of irregular form, or somewhat roughened, so as to cause rather violent or excessive movement of the work engaging element 11. This movement, however, would not be transmitted to the arm 40, since the lost motion provided by the space 55 is sufficient to permit the movable element 43 to be raised above the position where it brings the block 31 against its stop. When the work is reduced in size until the desired dimension is almost reached, then the abutment 51 is brought into yielding pressure contact with the point 50 by means of the spring 52, and the gage arm 40 becomes immediately effective and responds to the movement of the work engaging element. As soon as the work is reduced to the exact size desired, as determined by the previous setting of the gage, then the arm 40 moves to a vertical position and completes the circuit through the strips 70 and 72, causing the green light to be energized while the red light is continued energized, and indicating an amber color to show that the desired size relationship has been attained. At the same time the green light is energized a circuit is completed through a relay 99 which opens a switch 100 arranged in series with a motor 101 which is energized by a supply line 102. The motor 101 may be the main drive motor of the machine tool or the motor controlling the feed of the grinding wheel 26 towards the work, so that the sizing operation which the wheel performs will be instantly and automatically stopped as soon as the work is reduced to the desired predetermined size.

The connection between the housing 10 and the arm 15 is such that the latter may be very readily removed so that it may be replaced by an arm which is adapted to carry a locating or stop adapted for engagement with an internal passage or bore in the work piece. Thus as shown in Figs. 1 to 3, the arm 15 may be removed by unscrewing a holding screw 104 and then swinging the arm counterclockwise about a supporting stud 105 arranged on the housing, the slot 106 in the arm permitting the latter to be readily separated entirely from the housing. The housing will then be supplied with a second arm 108, held in place by supporting screws 109, and carrying a locating finger 110 adapted for engagement with the downwardly facing surface or internal diameter of a work piece 111. A second locating finger 112 may be provided on the arm 108 to engage a side of the bore and locate the housing with respect to the work piece. The work engaging element 11 is replaced by a second work engaging element 114 which is long enough to project down into engagement with an upwardly facing surface portion of the bore 111, the lower end of the work engaging element being turned horizontally so that it may project into the passage in the work. The inside diameter of an opening in the work may thus be readily checked or compared with a standard size or dimension without modifying or changing any of the parts inside the housing of the same gage used for checking external diameters, it being merely necessary to change the work engaging element and the housing locating arm.

Figs. 4 and 5 show the same gage converted for measuring internal diameters on a work piece 117, the conversion being effected merely by changing a few simple parts of the mechanism contained within the housing 10, and by replacing the work engaging element 11 by a work engaging element 118 having a horizontal extension 119 that carries the gaging point 120 bearing upwardly against a downwardly facing surface of the work piece. The change in the mechanism inside the housing required to convert the gage shown in Fig. 1 is a rearrangement of the springs and a change in the positions of the abutment blocks 51 and 62, which are simply interchanged. In this case the abutment block 62 is positioned in the extending portion 45 and is normally spaced away from the thrust point 50, while the abutment block 51 is positioned in the lower portion of the movable block 31 and is held yieldingly in engagement with the thrust point 63. The spring 56 is now connected between a pin 121 on the movable block 31 and a pin 122 on the projecting portion 46 and yieldingly holds these two parts in abutting relation without exerting any yielding pressure on them with respect to the housing 10. The spring 52 is now connected between a pin 123 on the housing and the pin 58 on the movable element 43 and acts to exert a yielding force in an upward direction capable of overcoming the weight of the parts 31 and 43 and serving to hold the work engaging element in yielding pressure engagement with the work. The spring 56, as will be apparent, maintains the movable block 31 and the movable element 43 in yielding engagement with one another but permits the work engaging element to be moved downwardly by the work when the diameter of the opening in the work is considerably less than the desired size and after the downward movement of the movable block 31 is limited by the stop surfaces which the fixed block 28' provides. In the normal position of the movable block, with the arm 40 upright, the spring blades 32 and 33 will be straight and parallel to one another, and the movable block 31 will be in the same position in the housing corresponding to the normal position shown in Fig. 1 because the height of the abutment block 51 exceeds that of the abutment block 62 by an amount equal to the lost motion that may take place between the movable block 31 and the element 43.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gage comprising a work-engaging element adapted to contact and be moved by the work, a support, means mounting said element on said support for reciprocatory movement towards and from the work position, a movable block, a pair of parallel spring blades fixed to said support and to said block and mounting said block for reciprocatory movement towards and from the work position, a movable arm having connections to said block and to the support and operated in accordance with the movements of said block, stop means positively limiting the movement of said block in one direction to limit the movement of said arm, and spring means interconnecting said block and said work-engaging element and normally holding portions thereof in abutting engagement and adapted to yield to provide continued movement of said element when the work moves said block against said stop means.

2. A gage comprising a work-engaging element adapted to contact and be moved by the work, a support, means mounting said element on said support for reciprocatory movement towards and from the work position, a movable block, a pair of parallel spring blades fixed to said support and to said block and mounting said block for reciprocatory movement towards and from the work position, a movable arm having connections to said block and to the support and operated in accordance with the movements of said block, stop means positively limiting the movement of said block in one direction to limit the movement of said arm, and spring means interconnecting said block and said work-engaging element and normally holding portions thereof in abutting engagement and adapted to yield to provide continued movement of said element when the work moves said block against said stop means, said support forming a housing enclosing said movable block, spring blades and movable arm.

3. A gage comprising a work-engaging element adapted to contact and be moved by the work, a support, a pair of parallel spring blades fixed to said support and to said element and mounting said element on said support for reciprocatory movement towards and from the work position, a movable block, a pair of parallel spring blades fixed to said support and to said block and mounting said block for reciprocatory movement towards and from the work position, a movable arm having connections to said block and to the support and operated in accordance with the movements of said block, stop means on said support positively limiting the movement of said block in one direction to limit the movement of said arm, and spring means interconnecting said block and said work-engaging element and normally holding portions thereof in abutting engagement and adapted to yield to provide continued movement of said element when the work moves said block against said stop means.

4. A gage comprising a work-engaging element adapted to contact and be moved by the work, a support, means mounting said element on said support for reciprocatory movement towards and from the work position, a movable block, means mounting said block for reciprocatory movement towards and from the work position, a movable arm connected to and operated in accordance with the movements of said block, stop means forming positive limits to the movement of said block, a spring interconnecting said block and said work-engaging element and yieldingly holding portions thereof in abutting engagement to provide continued movement of said element when the work moves said block in one direction against said stop means, and means for reversely connecting the spring to yieldingly hold other portions of the block and work engaging element in abutting engagement to provide continued movement of said element when the work moves said block in the other direction against said stop means.

5. A gage comprising a work-engaging element adapted to contact and be moved by the work, a support, means mounting said element on said support for reciprocatory movement towards and from the work position, a movable block, a pair of parallel spring blades fixed to said support and to said block and mounting said block for reciprocatory movement towards and from the work position, a movable arm having connections to said block and to the support and operated in accordance with the movements of said block, stop means forming positive limits to the movement of said block, a spring interconnecting said block and said work-engaging element and yieldingly holding portions thereof in abutting engagement to provide continued movement of said element when the work moves said block in one direction against said stop means, and means for reversely connecting the spring to yieldingly hold other portions of the block and work-engaging element in abutting engagement to provide continued movement of said element when the work moves said block in the other direction against said stop means.

6. A gage comprising a work-engaging element adapted to contact and be moved by the work, a support, means mounting said element on said support for reciprocatory movement towards and from the work position, a movable block, means mounting said block for reciprocatory movement towards and from the work position, a movable arm connected to and operated in accordance with the movements of said block, stop means forming positive limits to the movement of said block, said element and block interfitting with a part of one interposed between parts of the other having a greater spacing than the length of said interposed part, a spacing member removably held on one of said parts in either of a plurality of positions for abutting engagement with either one of the other parts, spring means, and means providing connection of said spring means to said element and said block in a plurality of reversed positions to yieldingly hold said spacing member in said abutting engagement and provide for continued movement of said element when the work moves said block against said stop means.

7. A gage comprising a work-engaging element adapted to contact and be moved by the work, a support, a movable block, a pair of parallel spring blades fixed to said support and to said block and mounting said block for reciprocatory movement towards and from the work position, a connection between said element and said block for moving the block in accordance with the movements of said element, a movable arm having connections to said block and to the support and operated in accordance with the movements of said block, stop means forming positive limits to the movement of said block on said support, spring means yieldingly interconnecting said block to the support, and spring anchorages on the support and the block adapted for connection of the spring means in different positions in one of which the element is yieldingly urged outwardly on the support in opposition to work pressure on the element and in the other of which the element is yieldingly urged inwardly on the support in opposition to work pressure on the element.

8. A gage comprising a work-engaging element adapted to contact and be moved by the work, a support, a movable block, a pair of parallel spring blades fixed to said support and to said block and mounting said block for reciprocatory movement towards and from the work position, a connection between said element and said block for moving the block in accordance with the movements of said element, a movable arm having connections to said block and to the support and operated in accordance with the movements of said block, a rigid switch arm at each side of said movable arm, means for independently adjusting the positions of said switch arms, a flexible switch blade on the outer side of each switch arm and normally yieldingly contacting its respective switch arm, said movable arm having means engageable selectively with the flexible switch blades, said support enclosing said block, spring blades, movable arm and switch means and having a window in front of the arm, and fixed means visible through said window and in registration with said arm when perpendicular to said spring blades.

9. A gage comprising a work-engaging member adapted to contact and be moved by the work, a support, a carrying block detachably supporting said member, means mounting said carrying block on said support for reciprocatory movement towards and from the work position, a movable block, a pair of parallel spring blades fixed to said movable block and to said support and mounting said block for reciprocatory movement towards and from the work position, spring means for holding said carrying block in abutting engagement with a portion of said movable block in a gaging operation, a movable arm connected to said movable block for operation thereby, a fixed arm removably carried on said support for contacting the side of the work opposite said work-engaging member, and spring means adapted for reversible connection between said movable block and said support for yieldingly urging said work engaging member either outwardly or inwardly on said support and in opposition to pressure on said work member.

10. A gage comprising a supporting housing having a work anvil, means for adjustably mounting said housing for bodily movement, means yieldingly urging said housing in one direction on said first named means, a work engaging element adapted to contact and be moved by the work and movable on said housing for reciprocatory movement towards and from the work position, a movable block in said housing, a pair of parallel spring blades fixed to said housing and to said block and mounting said block for reciprocatory movement towards and from the work position, a movable arm having connections to said block and to the housing and operated in accordance with the movements of said block, switch means operated by said arm, stop means positively limiting the movement of said block in one direction on said housing to positively limit the movement of said arm in one direction, and means interconnecting said block and said work-engaging element and normally holding portions thereof in abutting engagement and adapted to yield to provide continued movement of said element when work being gaged moves said block against said stop means.

11. A gage adapted for gaging machine driven work pieces comprising a work-engaging element adapted to contact and be moved by the work, a support, means mounting said element on said support for reciprocatory movement towards and from the work location, means fixed on said support for engagement with the work on the side opposed to said element, a movable member carried by said support for positioning in accordance with the position of said element, a connection between said member and said element including a spring normally pressing the element against a portion of said member and adapted to yield to provide continued movement of said element when the work produces a limiting position of said member, positive stop means providing a limiting position of said member on the support, switch means operated by said movable member when the work is over a predetermined size, carrying means for said support, and means yieldingly connecting said carrying means and said support for movement of said support in the direction in which said element is movable on said support.

LOUIS F. POOCK.
WILLIS FAY ALLER.